United States Patent [19]

Moriarity et al.

[11] 4,420,574

[45] Dec. 13, 1983

[54] UNGELLED POLYEPOXIDE-POLYOXYALK-YLENEPOLYAMINE RESINS, AQUEOUS DISPERSIONS THEREOF, AND THEIR USE IN CATIONIC ELECTRODEPOSITION

[75] Inventors: Thomas C. Moriarity, Allison Park; William J. Geiger, New Kensington, both of Pa.

[73] Assignee: PPG Industries, Inc., Pittsburgh, Pa.

[21] Appl. No.: 420,551

[22] Filed: Sep. 20, 1982

Related U.S. Application Data

[62] Division of Ser. No. 284,865, Jul. 20, 1981, abandoned.

[51] Int. Cl.$^3$ .............................................. C08L 63/02
[52] U.S. Cl. ................................ 523/404; 204/181 C; 523/415; 523/416; 523/417; 523/420; 524/901; 525/113; 525/526
[58] Field of Search ............... 523/404, 415, 416, 417, 523/420; 524/901; 204/181 C; 525/113, 526

[56] References Cited

U.S. PATENT DOCUMENTS

| 3,316,185 | 4/1967 | Reinking .................................. 260/2 |
| 3,380,881 | 4/1968 | Williamson et al. ................. 161/185 |
| 3,462,393 | 8/1969 | Legler .................................... 260/47 |
| 3,496,138 | 2/1970 | Sellers et al. ......................... 260/47 |
| 3,553,111 | 1/1971 | Ginilewicz et al. .................... 260/2 |
| 3,963,663 | 6/1976 | Sekmakas ............................ 260/29.3 |
| 3,975,250 | 8/1976 | Marchetti et al. ................... 204/181 |
| 4,093,594 | 6/1978 | Anderson ......................... 260/47 EP |
| 4,115,226 | 9/1978 | Zwack et al. ..................... 204/181 C |
| 4,116,900 | 9/1978 | Belanger .......................... 260/18 EP |
| 4,134,865 | 1/1979 | Tominaga ........................... 524/901 |
| 4,176,110 | 11/1979 | Otsuki et al. ........................ 524/901 |
| 4,179,552 | 12/1979 | Waddill ............................... 528/111 |
| 4,186,124 | 1/1980 | Schimmel et al. ............. 260/37 EP |
| 4,227,982 | 10/1980 | Sekmakas et al. ............. 204/181 C |

FOREIGN PATENT DOCUMENTS 242198 6/1960 Australia .

*Primary Examiner*—Theodore E. Pertilla
*Attorney, Agent, or Firm*—William J. Uhl

[57] ABSTRACT

Ungelled resins, aqueous dispersions of cationic resins, coating compositions, and electrodeposition using the resinous coating compositions are disclosed. The resins are formed from reacting polyepoxides with polyoxyalkylenepolyamines. The aqueous dispersions are prepared by at least partially neutralizing the resins to provide cationic groups and dispersing the cationic resins in aqueous medium. When added to cationic electrode-positable coating compositions, such as high throwpower compositions, the ungelled cationic resins provide better appearing, more flexible and water-resistant electrodeposited coatings.

9 Claims, No Drawings

UNGELLED POLYEPOXIDE-POLYOXYALKYLENEPOLYAMINE RESINS, AQUEOUS DISPERSIONS THEREOF, AND THEIR USE IN CATIONIC ELECTRODEPOSITION

This is a division of application Ser. No. 284,865, filed July 20, 1981, now abandoned.

BACKGROUND OF THE INVENTION

The present invention relates to ungelled resins, aqueous dispersions of the resins, and electrodeposition using the aqueous dispersions.

Electrodeposition as a coating application method involves the deposition of a film-forming composition under the influence of an applied electrical potential. Electrodeposition has become increasingly important in the coatings industry because, by comparison with non-electrophoretic coating means, electrodeposition offers higher paint utilization, outstanding corrosion protection and low environmental contamination. Initially, electrodeposition was conducted with a workpiece being coated serving as the anode. This was familiarly referred to as anionic electrodeposition. However, in 1972, cationic electrodeposition was introduced commercially. Since that time, cationic electrodeposition has steadily gained in popularity and today is by far the most prevalent method of electrodeposition. Throughout the world, more than 80 percent of all motor vehicles produced are given a primer coating by cationic electrodeposition. Other areas of application are primer coating or one-coat topcoating of automobile accessories, farm machinery, house and electrical appliances, steel furniture and structural components.

A serious problem associated with electrodeposition as practiced industrially is surface defects in films. A particularly acute problem is cratering or the development of small depressions in the surface of the coating. The sources of cratering unfortunately are many and some of the more important sources are believed to be impurities in the electrodeposition bath which may be, for example, oil or pretreatment chemicals introduced into the bath along with the article to be coated. One solution to the problem is to eliminate the source of contamination. However, since the sources are many, this may not be practical on an industrial scale.

The present invention provides a better appearing electrodeposition coating by eliminating or substantially minimizing cratering. Besides films relatively free of craters, the invention also provides for more flexible and water-resistant electrodeposited coatings.

SUMMARY OF THE INVENTION

In accordance with the present invention, an aqueous resinous dispersion is provided. The dispersion contains from:

(A) 0.5 to 40 percent by weight of an ungelled resin formed from reacting:
  (i) a polyepoxide with
  (ii) a polyoxyalkylenepolyamine; the ratio of equivalents of active hydrogens in (ii), with primary amine groups being considered monofunctional, to equivalents of epoxy in (i) being within the range of 1.20 to 1.70:1;
the reaction product being at least partially neutralized with acid to provide cationic groups, (B) 60 to 99.5 percent by weight of an additional cationic resin different from (A) and which is electrodepositable on a cathode; the percentages by weight being based on total weight of (A) plus (B).

BRIEF DESCRIPTION OF THE PRIOR ART

U.S. Pat. No. 3,963,663 discloses cationic electrodepositable coating compositions which are formed from reacting an epoxy-urethane resin with an organic diprimary amine, such as polyoxypropylenediamine. The reaction product can be neutralized with acid and dispersed in aqueous medium for use as a cationic electrodepositable coating vehicle. The ratio of organic diprimary amine to polyepoxide is about one mole or two equivalents of primary amine per equivalent of epoxy, ±5 percent, presumably 1.9–2.1 equivalents of primary amine (presuming primary amine is monofunctional) per equivalent of epoxy. U.S. Pat. No. 3,963,663 indicates control of the equivalent ratio is important so as to minimize undesirable crosslinking and chain growth.

The preferred ungelled resins of the present invention differ from those of U.S. Pat. No. 3,963,663 in that the equivalent ratio of polyoxyalkylenepolyamine to polyepoxide is 1.2 to 1.8 equivalents of primary amine (taking primary amine as being monofunctional) per equivalent of epoxide. This equivalent ratio results in chain growth which U.S. Pat. No. 3,963,663 has found undesirable and seeks to avoid. In addition, there is no teaching in U.S. Pat. No. 3,963,663 of combining the disclosed reaction products with a conventional cationic electrodepositable resin to provide an improved coating composition. In U.S. Pat. No. 3,963,663, the acid-neutralized epoxy-urethane-diprimary amine reaction products are disclosed as the sole electrocoating vehicles.

U.S. Pat. No. 4,179,552 discloses a process for accelerated cure of an epoxy resin. The process involves mixing an epoxy resin such as a polyglycidyl ether of a polyphenol with the reaction product of an epoxy resin and an aminoalkylene derivative of a polyoxyalkylenepolyamine. The mixtures are self-curing at 0° to 45° C. There is no disclosure in the patent of forming ungelled resins nor of forming aqueous dispersions of cationic resins. The resins are prepared neat and are not treated with acid.

U.S. Pat. No. 3,462,393 discloses a method of curing an epoxy resin by mixing together a polyglycidyl ether of a phenolic compound and a polyoxyalkylenepolyamine. There is no disclosure in this reference of forming ungelled resins nor of forming aqueous dispersions of cationic resins.

DETAILED DESCRIPTION

The ungelled resins of the invention are prepared by reacting a polyepoxide with polyoxyalkylenepolyamines. The equivalent ratio of amine to epoxy is preferably controlled within the range of 1.15–1.80:1 so as to get a reaction product with the required molecular weight and chain length to provide the benefits of the invention. The reaction product can be at least partially neutralized with acid to provide cationic groups and dispersed in aqueous medium.

By "non-gelled" is meant the reaction products are substantially free of crosslinking and have an intrinsic viscosity when dissolved in a suitable solvent. The intrinsic viscosity of the reaction product is an indication of its molecular weight. A gelled reaction product, on the other hand, since it is of essentially infinitely high molecular weight, will have an intrinsic viscosity too high to measure.

The polyepoxides useful in the preparation of the ungelled cationic resinous compositions of the present invention have an average 1,2-epoxy functionality greater than one, preferably at least about 1.4, and most preferably about 2. Polyepoxides having an average epoxy functionality much above 2.0 can be used but are not preferred because of gelation problems on reaction with the polyoxyalkylenepolyamine. Examples of higher functionality polyepoxides are epoxidized Novalac resins.

The polyepoxides which are preferred are polyglycidyl ethers of cyclic polyols having a molecular weight of about 340 to 5000, preferably 340 to 2000, and an epoxy equivalent of about 170 to 2500, preferably 170 to 1000. These may be produced, for example, by etherification of a polyphenol with epichlorohydrin or dichlorohydrin in the presence of alkali. The phenolic compound may be bis(4-hydroxyphenyl)-2,2-propane, 4,4'-dihydroxybenzophenone, bis(4-hydroxyphenyl)-1,1-ethane, bis(4-hydroxyphenyl)-1,1-isobutane, bis(4-hydroxytertiarybutylphenyl)-2,2-propane, bis(2-hydroxynaphthyl)methane, 1,5-hydroxynaphthalene and the like.

Examples of other polyepoxides, although they are not preferred, are polyglycidyl ethers of polyhydric alcohols such as ethylene glycol, diethylene glycol, triethylene glycol, 1,2-propylene glycol, 1,3-propylene glycol, 1,4-butylene glycol, 1,5-pentanediol, polyethylene glycol, polypropylene glycol and the like.

The preferred polyoxyalkylenepolyamines useful in the practice of the invention are diamines having the following structural formula:

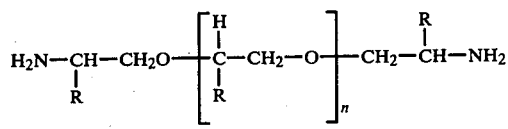

wherein R can be the same or different and is selected from the class consisting of hydrogen, lower alkyl radicals having from 1 to 6 carbon atoms, and n represents an integer of from about 1 to 50, preferably 1 to 35. A number of such polyoxyalkylenepolyamines are described in more detail in U.S. Pat. No. 3,236,895, column 2, lines 40–72; methods of preparation of the polyoxyalkylenepolyamines are illustrated in the patent in Examples 4, 5, 6 and 8–12 in columns 4 to 9 thereof; the aforementioned portions of U.S. Pat. No. 3,263,895 hereby being incorporated by reference.

Mixed polyoxyalkylenepolyamines can be used, that is, those in which the oxyalkylene group can be selected from more than one moiety. Examples would be mixed polyoxyethylene-propylenepolyamines such as those having the following structural formula:

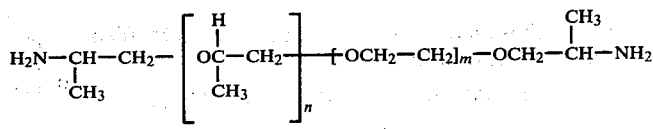

wherein n+m is equal to 1 to 50, preferably 1 to 35, m is equal to 1 to 49, preferably 1 to 34, and n is equal to 1 to 34.

Besides the polyoxyalkylenepolyamines mentioned above, derivatives of polyoxyalkylenepolyamines may also be usable. Examples of suitable derivatives would be aminoalkylene derivatives which are prepared by reacting polyoxyalkylenepolyamines such as those mentioned above with acrylonitrile followed by hydrogenation of the reaction product. An example of a suitable derivative would be that of the following structural formula:

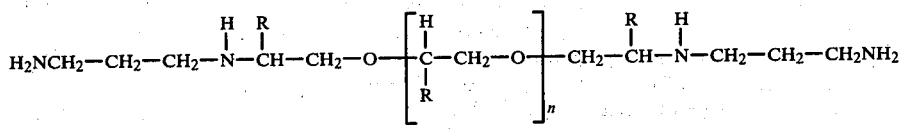

wherein R and n have the meanings mentioned above.

Therefore, in the practice of the invention, where the expression "polyoxyalkylenepolyamines" is used, what is intended are polyamines containing both oxyalkylene groups and at least two amine groups, preferably primary amine groups, per molecule. The polyamine preferably will have a molecular weight (number average) of about 137 to 3600, preferably about 400 to 3000, and most preferably 800 to 2500. The polyamines will preferably have amine equivalent weights of about 69 to 1800, preferably about 200 to 1500, and most preferably 400 to 1250. In determining the equivalent weights, the primary amines are considered to be monofunctional. Products with molecular weights much higher than 3600 are not preferred because of poor solubility characteristics. Products with molecular weights less than 137 are not preferred because of gelation problems.

Higher polyoxyalkylenepolyamines such as triamines are not preferred in the practice of the invention because of gelation problems. If they are used, they should be used with monofunctional amines so as to reduce the average functionality.

The ratio of equivalent active hydrogens in polyoxyalkylenepolyamine to equivalent of epoxy in the polyepoxide is preferably within the range of 1.15 to 1.80:1, preferably 1.20 to 1.70:1, most preferably 1.25 to 1.50:1 to produce reaction products giving the desirable properties. Equivalent ratios less than 1.15:1 are not preferred because of gelation problems, whereas ratios greater than 1.80:1 are not preferred because of low molecular weight products and the possibility of undesirable amounts of free amine. The equivalent ratio is based on the equivalent of 1,2-epoxy groups and equivalent of active hydrogens which are capable of reacting with 1,2-epoxy groups, e.g., amino, hydroxyl, and thiol, with the primary amine being considered monofunctional. As mentioned above, the equivalent ratios are preferably within the range stated. It may be possible to go outside the ranges and get acceptable products. For example, equivalent ratio of (B) to (A) less than 1.15 may be used if some monofunctional amine is present so as to reduce functionality and avoid gelation.

In preparing the reaction products of this invention, the polyepoxide is usually added to the polyoxyalkylenepolyamine. Usually, the temperature of the reaction will be about 50° to 180° C., preferably from about 90° to 150° C.

The reaction can be conducted neat or in the presence of solvent. The solvent is one which is non-reactive with epoxide groups and amine groups under the reaction conditions employed. Suitable solvents include hydrocarbons, ethers, alcohols and ether-alcohols. Preferably, solvents are water soluble such as glycol monoethers and glycol diethers. The amount of solvent used will vary between from 0 to 90, preferably about 5 to 50 percent based on total weight of the reaction mixture.

The polyepoxide-polyoxyalkylenepolyamine reaction product is characterized as being substantially free from epoxy functionality (that is, epoxy equivalent greater than 10,000) and containing amine, preferably primary amine functionality. The reaction product is dispersible in aqueous medium upon at least partial neutralization with acid.

Suitable acids include organic acids such as formic acid, lactic acid and acetic acid, and inorganic acids such as phosphoric acid. The extent of neutralization depends upon the particular reaction product and usually only sufficient acid is added to solubilize or disperse the resin. Usually, the resin is neutralized to an extent of at least 30 percent of the total theoretical neutralization.

The polyepoxide-polyoxyalkylenepolyamine resins when at least partially neutralized with acid are characterized as being non-gelled and dispersible in aqueous medium. The term "dispersion" as used within the context of the present invention is believed to be a two-phase transparent, translucent or opaque aqueous resinous system in which the resin is the dispersed phase and water the continuous phase. Average particle size diameter of the resinous phase is generally less than 10, and preferably less than 5 microns. The concentration of the resinous phase in aqueous medium depends upon the particular end use of the dispersion and is generally not critical. Usually, the cationic resinous reaction products of the invention will be dispersed in the aqueous medium and the dispersion will contain from about at least 0.5 and usually from about 0.5 to 50 percent by weight of the cationic reaction products of the invention based on total weight of the dispersion.

Although the ungelled cationic polyepoxide-polyoxyalkylenepolyamine compositions (also referred to as cationic adduct) and most useful when formulated with conventional cationic electrodepositable resins to form cationic electrodepositable coating compositions, the adducts can be dispersed in aqueous medium without the conventional cationic electrodepositable resin being present and held for further use.

When used in cationic electrodeposition, the cationic adducts are formulated with cationic electrodepositable resins which are different from the cationic adduct. For example, the ungelled cationic adducts are particularly useful in combination with high throwpower cationic electrodepositable resins which are used in the electrocoating of articles with complex shapes such as automobiles.

Throwpower, as used in the context of this invention, is the ability of the cationic resin to coat completely the recessed areas and shielded portions of the cathode. Several methods have been proposed for measuring throwpower including the Ford Cell Test and the General Motors Cell Test. See, for example, Brewer et al, *Journal of Paint Technology*, 41, No. 535, pages 461–471 (1969); and Gilchrist et al, *American Chemical Society, Div. of Organic Coatings and Plastics Chemistry, Preprint Book* 31, No. 1, pages 346–356, Los Angeles Meeting, March–April 1971. Throwpower is reported in inches, the higher the value, the greater the throwpower. In this invention, where throwpower is mentioned, General Motors or GM throwpower is intended.

Accordingly, the adducts of the present invention which typically have GM throwpower of 6 inches or less are useful in combination with high throwpower cationic electrodepositable resins having GM throwpower of 10 inches, preferably 12 inches or more.

Examples of high throwpower cationic electrodepositable resins include amine salt group-containing resins which are the acid-solubilized reaction products of polyepoxides and primary or secondary amines such as described in U.S. Pat. No. 4,031,050 to Jerabek. Usually, these amine salt group-containing resins are used in combination with a blocked isocyanate curing agent. The isocyanate can be fully blocked as described in the aforementioned U.S. Pat. No. 4,031,050, or the isocyanate can be partially blocked and reacted with a resin. Such resinous systems are described in U.S. Pat. No. 3,947,358 to Jerabek et al. Also, such one-component compositions are described in U.S. Pat. No. 4,134,866 and DE-OS No. 2,752,255. Besides high throwpower cationic electrodepositable resins, the cationic adducts of the invention can also be used with low throwpower resins such as cationic acrylic resins. Examples of these resins are described in U.S. Pat. Nos. 3,455,806 and 3,928,157.

Besides amine salt group-containing resins, quaternary ammonium salt group-containing resins can also be employed. Examples of these resins are those which are formed from reacting an organic polyepoxide with a tertiary amine acid salt. Such resins are described in U.S. Pat. Nos. 3,962,165; 3,975,346 and 4,001,156 to Bosso and Wismer. Examples of other cationic resins are ternary sulfonium salt group-containing resins such as those described in U.S. Pat. No. 3,793,278 to DeBona. Also, cationic electrodepositable resins which cure via a transesterification mechanism such as described in European Patent Application No. 12463 can also be employed.

The cationic adducts of the invention and the conventional cationic electrodepositable resins can be combined by simply blending the two together with mild agitation. Preferably, both cationic products are in the form of aqueous dispersions having a solids content of 0.5 to 50 percent. Prior, during or after blending, the mixture can be combined with optional ingredients such as pigment, cosolvents, plasticizers, and other ingredients such as fungicides, curing agents and catalysts, and thinned with deionized water to form the correct resin solids content for cationic electrodeposition.

The cationic adducts provide for better appearance of the cured coating, particularly with regard to craters. Also, the adducts provide for more flexible and more water-resistant films.

The amount of cationic adduct in the coating composition is preferably within the range of about 0.5 to 40, more preferably from about 1 to 20 percent by weight, based upon total weight of cationic resin solids. In combination with high throwpower cationic electrodepositable resins, which are present in amounts of 60 to 99.5, preferably 80 to 99 percent by weight based on total weight of cationic resin, as the amount of cationic adduct increases, throwpower and salt spray corrosion properties usually decrease. As the amount of cationic adduct decreases, appearance, flexibility and water resistance decreases.

The blend of the cationic adduct and conventional cationic electrodepositable resin is in the form of an aqueous dispersion. The term "dispersion" is believed to be, as described above, a two-phase, transparent, translucent or opaque resinous system in which the resin is the dispersed phase and water is the continuous phase. The average particle size diameter of the resinous phase is generally less than 10 and preferably less than 5 microns. The concentration of the resinous phase in the aqueous medium is usually at least 0.5 and usually from about 0.5 to 50 percent by weight based on total weight of the aqueous dispersion.

Besides water, the aqueous medium may contain a coalescing solvent. Useful coalescing solvents include hydrocarbons, alcohols, esters, ethers and ketones. The preferred coalescing solvents include alcohols, polyols and ketones. Specific coalescing solvents include isopropanol, butanol, 2-ethylhexanol, isophorone, 4-methoxy-pentanone, ethylene and propylene glycol, and the monoethyl, monobutyl and monohexyl ethers of ethylene glycol. The amount of coalescing solvent is not unduly critical and is generally between about 0.01 and 40 percent, preferably about 0.05 to about 25 percent by weight based on total weight of the aqueous medium. In some instances, a pigment composition, and if desired, various additives such as surfactants or wetting agents are included in the dispersion. Pigment composition may be of the conventional types, comprising, for example, iron oxides, lead oxides, strontium chromate, carbon black, coal dust, titanium dioxide, talc, barium sulfate, as well as color pigments such as cadmium yellow, cadmium red, chromium yellow and the like. The pigment content of the dispersion is usually expressed as the pigment-to-resin ratio. In the practice of the present invention, the pigment-to-resin ratio is usually within the range of 0.02 to 1:1. The other additives mentioned above are usually in the dispersion in amounts of about 0.01 to 3 pecent by weight based on total weight of resin solids.

When the aqueous dispersions as described above are employed for use in electrodeposition, the aqueous dispersion is placed in contact with an electrically conductive anode and an electrically conductive cathode with the surface to be coated being the cathode. Following contact with the aqueous dispersion, an adherent film of the coating composition is deposited on the cathode and a sufficient voltage is impressed between the electrodes. The conditions under which the electrodeposition is carried out are, in general, similar to those used in electrodeposition of other types of coatings. The applied voltage may be varied and can be, for example, as low as one volt to as high as several thousand volts, but typically between 50 and 500 volts. The current density is usually between 0.5 ampere and 15 amperes per square foot and tends to decrease during electrodeposition indicating the formation of an insulating film.

The coating compositions of the present invention can be applied to a variety of electroconductive substrates especially metal such as steel, aluminum, copper, magnesium and the like, but also including metallized plastic and conductive carbon-coated materials. For other conventional coating applications, compositions can be applied to the non-metallic substrates such as glass, wood and plastic.

After the coating has been applied by electrocoating, it is cured, usually by baking at elevated temperature such as 90°–260° C. for about 1–30 minutes.

Illustrating the invention are the following examples which, however, are not to be considered as limiting the invention to their details. All parts and percentages in the examples as well as throughout the specification are by weight unless otherwise indicated.

CATIONIC ELECTRODEPOSITION VEHICLES

EXAMPLE A

A conventional cationic electrodeposition resin as generally described in U.S. Pat. No. 4,031,050 was prepared as follows:

Into a suitable reactor were charged 1019 parts by weight of EPON 1001 (polyglycidyl ether of bisphenol A commercially available from Shell Chemical Company having an epoxy equivalent weight of about 485) and 39 parts by weight of xylene and 265 parts by weight of a polycaprolactone diol sold commercially by Union Carbide Corporation under the trade name PCP-0200. The charge was heated to reflux and held for 30 minutes to remove any water present. After cooling to 140° C., 3.85 parts by weight of benzyldimethylamine were added to the reaction mixture. The temperature of the reaction mixture was held at 130° C. for appoximately 2½ hours.

To the reaction mixture was added 1003 parts by weight of a polyurethane crosslinker prepared as follows: 218 parts by weight of 2-ethylhexanol was added slowly to 291 parts of 80/20 2,4-/2,6-toluene diisocyanate in an agitated closed vessel under a dry nitrogen blanket with external cooling to keep the reaction mixture temperature under 100° C. The batch was held an additional ½ hour after all the 2-ethylhexanol was added and then heated to 140° C. at which point 75 parts of trimethylolpropane were added, followed by 0.08 part of dibutyltin dilaurate catalyst. After an initial exotherm, the bath was held at 250° C. for 1½ hours until essentially all of the isocyanate was consumed as indicated by an infrared scan. The batch was thinned with 249 parts of 2-ethoxyethanol.

The reaction mixture was then cooled to 110° C. at which time 64 parts by weight of methylethanolamine and 40 parts by weight of 70 percent non-volatile solution of methyl isobutyl diketimine of diethylene triamine in methyl isobutyl ketone were added to the reaction mixture. The diketimine was derived from one mole of diethylene triamine and 2 moles of methyl isobutyl ketone as described in U.S. Pat. No. 3,523,925.

After the addition of the diketimine and the methylethanolamine, the reaction mixture was held for one hour at 115° C. after which time the reaction mixture was thinned by adding 104 parts by weight of 2-hexoxyethanol. The reaction mixture was held for another hour at 115° C. after which time 2350 parts by weight of it was charged to another reactor and blended with a mixture of 24.7 parts by weight of glacial acetic acid, 48.3 parts by weight of a special cationic dispersant described below and 3017 parts by weight of deionized water.

The cationic dispersant was prepared by blending 120 parts of an alkyl imidazoline commercially available from Geigy Industrial Chemicals as GEIGY AMINE C, 120 parts by weight of an acetylenic alcohol commercially available from Air Products and Chemicals Inc. as SURFYNOL 104, 120 parts by weight of 2-butoxyethanol and 221 parts by weight of deionized water and 19 parts of glacial acetic acid.

EXAMPLE B

A conventional cationic resin similar to Example A was prepared from the following mixture of ingredients:

| Ingredients | Parts by Weight | Solids | Equivalents |
|---|---|---|---|
| EPON 829[1] | 727.6 | 702.2 | 3.735 |
| PCP-0200 | 268.4 | 268.4 | 1.000 |
| Xylene | 36.1 | | |
| Bisphenol A | 197.8 | 197.8 | 1.735 |
| Benzyldimethylamine | 3.8 | | |
| Capped isocyanate crosslinker[2] | 901.3 | 630.9 | |
| Diketimine derived from diethylene triamine and methyl isobutyl ketone (73% solids in methyl isobutyl ketone) | 73.4 | 53.4 | 0.612 |
| N—methylethanolamine | 59.1 | 59.1 | 0.787 |
| 2-hexoxyethanol | 76.5 | | |
| Acetic acid | 33.5 | | 0.559 |
| Cationic surfactant of Example A | 29.4 | | |
| Deionized water | 1793.1 | | |

[1] Epoxy resin solution made from reacting epichlorohydrin and bisphenol A having an epoxy equivalent of 188 commercially available from Shell Chemical Company.
[2] Polyurethane crosslinker formed from half-capping toluene diisocyanate (80/20 2,4-/2,6-isomer mixture) with 2-butoxyethanol and reacting this product with trimethylolpropane in a 3:1 molar ratio. The crosslinker is present as a 70 percent solids solution in a 90/10 mixture of methyl isobutyl ketone and n-butanol.

The EPON 829, PCP-0200 and xylene were charged to a reaction vessel and heated with a nitrogen sparge to 210° C. The reaction was held at reflux for about ½ hour to remove water. The reaction mixture was cooled to 150° C. and the bisphenol A and 1.6 parts of the benzyldimethylamine (catalyst) added. The reaction mixture was heated to 150°–190° C. and held at this temperature for about 1½ hours and then cooled to 130° C. The remaining portion of the benzyldimethylamine catalyst was added and the reaction mixture held at 130° C. for 2½ hours until a reduced Gardner-Holdt viscosity (50 percent resin solids solution in 2-ethoxyethanol) of P was obtained.

The polyurethane crosslinker, the diketimine derivative and the N-methylethanolamine were then added and the temperature of the reaction mixture brought to 110° C. and held at this temperature for 1 hour.

The 2-hexoxyethanol was added and the reaction mixture was dispersed in water by adding the reaction mixture to a mixture of the acetic acid, deionized water and the cationic surfactant mixture. This dispersion was diluted to 32 percent solids with deionized water and vacuum stripped to remove organic solvent to give a dispersion having a solids content of 36 percent.

EXAMPLE C

A conventional cationic electrodeposition resin as generally described in the article entitled "Modern Developments in Aqueous Industrial Coatings" by W. J. Van Westrenen appearing in J. OIL. COLOR. CHEM. ASSOC., 1979, 62, 246–255, on page 253, was prepared from the following ingredients:

| Ingredients | Parts by Weight | Solids | Equivalents | |
|---|---|---|---|---|
| EPON 829 | 921.4 | 891.0 | 4.539 | ⎫ 2.293 |
| Bisphenol A | 256.0 | 256.0 | 2.246 | ⎬ (epoxy equivalent 500) |
| Xylene | 50.0 | | | ⎭ |
| Diethanolamine | 80.2 | 80.2 | 0.764 | |
| Monoethanolamine | 17.4 | 17.4 | 0.570 | |
| Hexamethylenediamine | 44.4 | 44.4 | 1.531 | |
| Sulfanilic acid | 16.6 | 16.6 | 0.192 | |
| CARDURA E[1] | 280.1 | 280 | 1.051 | |
| Butyl CELLOSOLVE | 629.2 | | | |

[1] CARDURA E is the glycidyl ester of Versatic acid commercially available from Shell Chemical Company.

The EPON 829, bisphenol A and xylene were charged to a reaction vessel under a nitrogen blanket and heated to reflux. Reflux was held for 30 minutes and the xylene sparged off over another 30-minute period. Sparging was stopped, the reaction mixture cooled to 110° C. and 350 parts of the 2-butoxyethanol added. The reaction mixture was cooled to 60° C. followed by the addition of the sulfanilic acid and the diethanolamine to the reaction mixture. The mixture was held at 60° C. for one hour.

A second reaction vessel was charged with the ethanolamine, hexamethylenediamine and 279.2 grams of the 2-butoxyethanol. The ingredients were heated to 60° C. under a nitrogen blanket followed by the dropwise addition of the CARDURA E. At the completion of the addition, the reaction mixture was heated to 100° C. and held for one hour followed by cooling to 80° C. The contents of the first reaction vessel were then added to the contents of the second reaction vessel over the period of about 20 minutes. At the completion of the addition, the reaction mixture was held at 80° C. for one hour. The reaction mixture had a theoretical solids content of 72.9 percent.

The resinous reaction mixture prepared as described above was combined with an aminoplast crosslinking agent, solubilized with acid and dispersed in water as follows:

| Ingredients | Parts by Weight (in grams) | Solids | Equivalents |
|---|---|---|---|
| Resinous reaction product prepared as described above | 1755.8 | 1280.0 | 1.465 |
| CYMEL 303[1] | 320.0 | 320.0 (20% based on solids) | |
| 88% Aqueous lactic acid | 67.4 | | 0.659 (45% of the total theoretical neutralization) |
| Deionized water | 2442.8 | | |

[1] Hexakis(methoxymethyl)melamine commercially available from American Cyanamid Company.

The resinous reaction product and the CYMEL 303 were charged to a stainless steel beaker and blended thoroughly. The lactic acid was added, blended well, followed by the addition of the deionized water with stirring. The resultant dispersion had a calculated solids content of 35 percent.

EXAMPLE D

A conventional cationic electrodeposition resin as generally described in DE-OS No. 2,752,255 (Cationic Resin III) was prepared by reacting a polyglycidyl ether of bisphenol A with a hydroxyethyl methacrylate half ester of tetrahydrophthalic anhydride and with toluene diisocyanate half-capped with diethylethanolamine. The reaction product was neutralised with acetic acid (70 percent total theoretical neutralization) and dispersed in deionized water to form a 38.6 percent resin solids dispersion.

EXAMPLE E

A conventional cationic electrodeposition resin was prepared as generally described in European Patent Application No. 12463 (Example V). The resin was a polyepoxide-amine adduct formed from reacting a polyglycidyl ether of bisphenol A (epoxy equivalent equals 472) with a mixture of amines. One of the amines was dimethylaminopropylamine. Another of the amines was a disecondary amine formed from reacting equimolar amounts of hexamethylenediamine with CARDURA E (1:2 molar ratio). These amines were for chain extending the polyepoxide. The remaining amine was diethanolamine which reacted with the terminal epoxy groups of the chain-extended polyepoxide.

The polyepoxide-amine adduct was then combined with a tetrafunctional polyester crosslinking agent (Example Ia of European Patent Application No. 12463) formed from reacting one mole of 1,6-hexanediol with 2 moles of CARDURA E, 2 moles of trimellitic anhydride and an additional 2.3 moles of CARDURA E and a lead crosslinking catalyst.

The mixture was solubilized with acetic acid (45 percent of the total theoretical neutralization) and dispersed in deionized water to form a 35 percent resin solids dispersion.

EXAMPLE F

A conventional cationic electrodepositable composition was prepared as generally described in Example 2 of U.S. Pat. No. 4,134,866. The electrodepositable composition was formed by blending the following:
(1) reaction product of EPON 1001 (epoxy equivalent 500) with diisopropanolamine and diethylamine,
(2) the reaction product of a polyamide resin having an amine value of 300 (VERSAMID 125) with
  (A) methyl isobutyl ketone to convert the primary amine groups to ketimine groups and
  (B) 2-ethoxyethanol half-capped TDI.

The mixture was solubilized with lactic acid (100 percent total theoretical neutralization) and dispersed in deionized water to form about a 40 percent resin solids dispersion.

Polyoxyalkylenepolyamine-Polyepoxide Adducts

The following (G–P) are Examples of the ungelled cationic resinous compositions of the invention.

EXAMPLE G

A polyoxyalkylenepolyamine-polyepoxide adduct having an amine to epoxide equivalent ratio of 1.34/1 was prepared as follows. A polyepoxide intermediate was first prepared from condensing EPON 829 and bisphenol A as follows:

| Ingredients | Parts by Weight |
|---|---|
| EPON 829 | 136.1 |
| Bisphenol A | 39.6 |
| 2-butoxyethanol | 52.3 |

The EPON 829 and bisphenol A were charged to a reaction vessel under a nitrogen blanket and heated to 160°–190° C. for ½ hour. The reaction mixture was cooled to 150° C. and the 2-butoxyethanol added. The reaction mixture had a solids content of 75 percent and an epoxy equivalent of 666.

A polyoxypropylenediamine having a molecular weight of 2000 and commercially available from Jefferson Chemical Company as JEFFAMINE D-2000 was reacted with the polyepoxide intermediate described above as follows:

| Ingredients | Parts by Weight |
|---|---|
| JEFFAMINE D-2000 | 132.7 |
| Polyepoxide intermediate | 67.4 |
| 2-butoxyethanol | 2.4 |
| Polyurethane crosslinker of Example B | 174.5 |
| Acetic acid | 3.9 |
| Surfactant of Example A | 7.4 |
| Deionized water | 459.0 |

The JEFFAMINE D-2000 was charged to a reaction vessel under a nitrogen atmosphere and heated to 90° C. The polyepoxide intermediate was added over a period of about ½ hour. At the completion of the addition, the reaction mixture was heated to 130° C., held for 3 hours, followed by the addition of the 2-butoxyethanol and the polyurethane crosslinker. The reaction mixture was then dispersed by blending with the acetic acid, cationic surfactant and deionized water. The dispersion had a solids content of 35.5 percent.

EXAMPLE H

A polyoxyalkylenepolyamine-polyepoxide adduct having an amine to epoxide equivalent ratio of 1.50:1 was prepared as generally described in Example G from the following mixture of ingredients:

| Ingredients | Parts by Weight | Solids |
|---|---|---|
| JEFFAMINE D-2000 | 800.0 | 800.0 |
| EPON 1001[1] | 265.2 | 265.2 |
| 2-butoxyethanol | 113.8 | |
| Polyurethane crosslinker of Example B | 1014.4 | 710.0 |

[1] Polyglycidyl ether of bisphenol A having an epoxide equivalent of 523 commercially available from the Shell Chemical Company.

The JEFFAMINE D-2000 was charged to a reaction vessel under a nitrogen sparge and heated to 90° C., followed by the addition of the EPON 1001 and 2-butoxyethanol. The reaction mixture was heated to 110° C., held for two hours, followed by the addition of the polyurethane crosslinker. The reaction mixture was dispersed as generally described in Example G by combining 2000 parts by weight of the reaction mixture (1618.8 parts solids) with 22.9 parts of acetic acid, 40.5 parts of the cationic surfactant and 1612.7 parts by weight of deionized water to form a 35.5 percent solids dispersion.

EXAMPLE I

A polyoxyalkylenepolyamine-polyepoxide adduct having an amine to epoxide equivalent ratio of 1.33:1 was prepared as generally described in Example H from the following mixture of ingredients:

| Ingredients | Parts by Weight | Solids |
|---|---|---|
| JEFFAMINE D-2000 | 1415.9 | 1415.9 |
| EPON 1001 | 489.1 | 489.1 |
| 2-butoxyethanol | 179.8 | |
| Polyurethane crosslinker of Example B | 1814.3 | 1270.0 |

| Dispersion Step | |
|---|---|
| Ingredients | Parts by Weight |
| Reaction mixture as described above | 3700 |
| Acetic acid | 29.5 |
| Cationic surfactant of Example A | 75.3 |
| Deionized water | 4679.1 |

The dispersion had a solids content of 35.0 percent.

EXAMPLE J

A polyoxyalkylenepolyamine-polyepoxide adduct having an amine to epoxy equivalent ratio of 1.25:1 was prepared as generally described in Example H from the following mixture of ingredients:

| Ingredients | Parts by Weight | Solids |
|---|---|---|
| JEFFAMINE D-2000 | 710.3 | 710.3 |
| EPON 1001 (epoxy equivalent 503) | 261.7 | 261.7 |
| 2-butoxyethanol | 102.3 | |
| Polyurethane crosslinker of Example B | 925.7 | 648 |

| Dispersion Step | |
|---|---|
| Ingredients | Parts by Weight |
| Composition as described above | 1800 |
| Acetic acid | 21.06 |
| Cationic surfactant of Example A | 36.5 |
| Deionized water | 2259.4 |

The dispersion had a solids content of 35.5 percent.

EXAMPLE K

A polyoxyalkylenepolyamine-polyepoxide adduct having an amine to epoxy equivalent ratio of 1.20:1 was prepared as generally described in Example H from the following mixture of ingredients:

| Ingredients | Parts by Weight | Solids |
|---|---|---|
| JEFFAMINE D-2000 | 807.7 | 807.7 |
| EPON 1001 | 310.1 | 310.1 |
| 2-butoxyethanol | 117.6 | |
| Polyurethane crosslinker of Example B | 1064.6 | 745.2 |

| Dispersion Step | |
|---|---|
| Ingredients | Parts by Weight |
| Composition as described above | 2100 |
| Acetic acid | 24.32 |
| Cationic surfactant of Example A | 42.5 |
| Deionized water | 2624.7 |

The dispersion had a solids content of 35.5 percent.

EXAMPLE L

A polyoxyalkylenepolyamine-polyepoxide adduct having an amine to epoxy equivalent ratio of 1.16:1 was prepared as generally described in Example H from the following mixture of ingredients:

| Ingredients | Parts by Weight | Solids |
|---|---|---|
| JEFFAMINE D-2000 | 801.5 | 801.5 |
| EPON 1001 (epoxy equivalent 503) | 316.4 | 316.4 |
| 2-butoxyethanol | 117.4 | |
| Polyurethane crosslinker of Example B | 1064.7 | 745.3 |

| Dispersion Step | |
|---|---|
| Ingredients | Parts by Weight |
| Composition as described above | 2100 |
| Acetic acid | 24.13 |
| Cationic surfactant of Example A | 42.5 |
| Deionized water | 2624.9 |

The dispersion had a solids content of 35.5 percent.

EXAMPLE M

A polyoxyalkylenepolyamine-polyepoxide adduct having an amine to epoxy equivalent ratio of 1.2:1 was prepared as follows:

| Ingredients | Parts by Weight |
|---|---|
| JEFFAMINE D-2000 | 822.9 |
| EPON 1001 (epoxy equivalent = 503) | 284.3 |
| 2-butoxyethanol | 120.7 |
| EPON 828 | 17.7 |
| Polyurethane crosslinker of Example B | 1054.5 |

The JEFFAMINE D-2000 was charged to a reaction vessel and heated to 90° C. The EPON 1001 and 2-butoxyethanol were then added, and the reaction mixture heated to 110° C. and held for 2 hours. The EPON 828 was then added, and the reaction mixture held at 110° C. for 2 hours, followed by the addition of polyurethane crosslinker.

| Dispersion Step | |
|---|---|
| Ingredients | Parts by Weight |
| Reaction mixture described above | 2100 grams |
| Acetic acid | 16.5 |
| Cationic surfactant of Example A | 42.5 |
| Deionized water | 1698.8 |

The dispersion had a solids content of 35.5 percent.

EXAMPLE N

A polyoxyalkylenepolyamine-polyepoxide adduct having an amine to epoxy equivalent ratio of 1.50:1 was prepared as generally described in Example G with the exception that the polyepoxide had an epoxy equivalent weight of 941 instead of 500. The adduct was prepared from the following mixture of ingredients:

| Ingredients | Parts by Weight | Solids |
|---|---|---|
| EPON 829 | 309.8 | 299.0 |
| Bisphenol A | 127.4 | 127.4 |
| 2-butoxyethanol | 160.7 | |
| JEFFAMINE D-2000 | 707.7 | 707.7 |
| Polyurethane crosslinker of Example B | 694.5 | 486.2 |

| Dispersion Step | |
|---|---|
| Ingredients | Parts by Weight |
| Reaction mixture as described above | 1600 |
| Acetic acid | 23.3 |
| Cationic surfactant of Example A | 32.4 |
| Deionized water | 2002.0 |

The dispersion had a solids content of 35.0 percent.

EXAMPLE O

A polyoxyalkylenepolyamine-polyepoxide adduct having an amine to epoxide eqivalent ratio of 1.40:1 and similar to Example H was prepared with the exception that the polyepoxide was a polypropylene glycol-diepoxide adduct having a molecular weight of about 752. The product is commercially available from Dow Chemical Company as DER-732. The adduct was prepared from the following mixture of ingredients:

| Ingredients | Parts by Weight | Solids |
|---|---|---|
| JEFFAMINE D-2000 | 1015.1 | 1015.1 |
| DER-732 | 273.7 | 273.7 |
| Polyurethane crosslinker of Example B | 789.1 | 522.3 |

| Dispersion Step | |
|---|---|
| Ingredients | Parts by Weight |
| Reaction mixture as described above | 1700 |
| Acetic acid | 34.1 |
| Deionized water | 2438.9 |

The dispersion had a solids content of 35.5 percent.

EXAMPLE P

A polyoxyalkylenepolyamine-polyepoxide adduct having an amine to epoxide equivalent ratio of 1.60:1 and similar to Example H was prepared with the exception that the polyoxyalkylenepolyamine had an amine equivalent of 202.6 instead of the 996. This polyamine is commercially available from Jefferson Chemical Company as JEFFAMINE D-400.

The adduct was prepared from the following mixture of ingredients:

| Ingredients | Parts by Weight | Solids |
|---|---|---|
| JEFFAMINE D-400 | 583.7 | 583.7 |
| EPON 1001 | 917.8 | 711.4 |
| Polyurethane crosslinker of Example B | 798.4 | 558.9 |

| Dispersion Step | |
|---|---|
| Ingredients | Parts by Weight |
| Reaction mixture as described above | 2150 |
| Acetic acid | 48.5 |
| Cationic surfactant of Example A | 43.3 |
| Deionized water | 1640.2 |

The dispersion had a solids content of 35.5 percent.

The above-described dispersion was not particularly stable. Additional deionized water and acetic acid were added to bring the neutralization to about 50 percent of the total theoretical neutralization and the resin solids content to about 30 percent. The dispersion on standing overnight separated into two phases, but could be redispersed with stirring.

Pigment Pastes

| Quaternizing Agent | | |
|---|---|---|
| Ingredients | Parts by Weight | Solids |
| 2-ethylhexanol half-capped toluene diisocyanate in methyl isobutyl ketone | 320.0 | 304 |
| Dimethylethanolamine | 87.2 | 87.2 |
| Aqueous lactic acid solution | 117.6 | 88.2 |
| 2-butoxyethanol | 39.2 | |

The 2-ethylhexanol half-capped toluene diisocyanate was added to the dimethylethanolamine in a suitable reaction vessel at room temperature. The mixture exothermed and was stirred for one hour at 80° C. Lactic acid was then charged followed by the addition of 2-butoxyethanol. The reaction mixture was stirred for about one hour at 65° C. to form the desired quaternizing agent.

Pigment Grinding Vehicle

A pigment grinding vehicle was prepared from the following charge:

| Ingredients | Parts by Weight | Solids |
|---|---|---|
| EPON 829 | 710 | 682 |
| Bisphenol A | 289.6 | 289.6 |
| 2-ethylhexanol monourethane of 2,4-toluene diisocyanate in methyl isobutyl ketone | 406.4 | 386.1 |
| Quaternizing agent as described above | 496.3 | 421.9 |
| Deionized water | 71.2 | |
| 2-butoxyethanol | 1490 | |

The EPON 829 and bisphenol A were charged under a nitrogen atmosphere to a suitable reaction vessel and heated to 150°–160° C. to initiate an exotherm. The reaction mixture was permitted to exotherm for one hour at 150°–160° C. The reaction mixture was then cooled to 120° C. and the 2-ethylhexanol half-capped toluene diisocyanate added. The temperature of the reaction mixture was held at 110°–120° C. for one hour, followed by the addition of the 2-butoxyethanol. The reaction mixture was then cooled to 85°–90° C., homogenized and then charged with water followed by the addition of the quaternizing agent. The temperature of the reaction mixture was held at 80°–85° C. until an acid value of about 1 was obtained. The reaction mixture had a solids content of 55 percent.

EXAMPLE Q

A pigment paste was prepared from the following mixture of ingredients:

| Ingredients | Parts by Weight |
| --- | --- |
| Titanium dioxide | 91.0 |
| Lead silicate | 6.0 |
| Carbon black | 3.0 |
| Pigment grinding vehicle as described above | 36.4 |
| Deionized water | 58.2 |

The above ingredients were mixed together and ground in a mill to a Hegman No. 7 grind.

EXAMPLE R

A pigment paste was prepared from the following mixture of ingredients:

| Ingredients | Parts by Weight |
| --- | --- |
| Pigment grinding vehicle as described above | 207.5 |
| Deionized water | 427.5 |
| ASP-170 clay (aluminum silicate) | 78.8 |
| TiO$_2$ | 403.9 |
| Lead silicate | 31.5 |
| Carbon black | 11.1 |

The above ingredients were ground to a Hegman No. 7 grind.

EXAMPLE S

A pigment paste was prepared from the following mixture of ingredients:

| Ingredients | Parts by Weight |
| --- | --- |
| Pigment grinding vehicle as described above | 207.5 |
| Deionized water | 427.4 |
| ASP-170 clay | 78.8 |
| TiO$_2$ | 302.6 |
| Lead silicate | 132.9 |
| Carbon black | 11.1 |
| Dibutyltin oxide | 40.0 |

The above ingredients were ground with Zircoa media to a Hegman No. 7½ grind.

CATALYST PASTE

EXAMPLE T

A dibutyltin oxide catalyst was dispersed in a grinding vehicle as follows:

| Ingredients | Parts by Weight |
| --- | --- |
| Pigment grinding vehicle prepared as described above | 145 |
| Deionized water | 321.6 |
| Dibutyltin oxide | 200 |

The above ingredients were mixed together and ground to a Hegman No. 7 grind.

CATIONIC ELECTRODEPOSITABLE COATING COMPOSITIONS

The following (1-4) are Examples of the improved cationic electrodepositable coating compositions of the invention. For the purposes of comparison, conventional electrodepositable coating compositions are also exemplified. Both the improved and conventional coating compositions were cathodically electrodeposited onto steel substrates, the electrodeposited coating cured at elevated temperature, and the cured coating evaluated for surface appearance, water resistance and flexibility as shown in Table I appearing at the end of the example.

EXAMPLE 1A

A conventional coating composition was prepared by blending the following mixture of ingredients:

| Ingredients | Parts by Weight |
| --- | --- |
| Cationic electrodeposition resin of Example B | 1751 |
| Catalyst paste of Example T | 14.2 |
| Pigment paste of Example Q | 246.9 |
| Deionized water | 1787.9 |

The coating composition (in the form of an electrodeposition bath) had a pH of 6.5, a specific conductivity of 1700 (micro-mhos/cm), a rupture voltage of 350 volts and a GM throwpower of 12¾ inches.

Both zinc phosphate pretreated steel and untreated steel panels were cathodically electrocoated in the electrodeposition bath at 275 volts for 2 minutes at a bath temperature of 73° F. (23° C.). The wet films were cured at 350° F. (177° C.) for 30 minutes.

EXAMPLE 1B

To the electrodeposition bath of Example 1A was added 6.5 parts by weight of an aqueous acid-solubilized solution of JEFFAMINE D-2000 which was obtained by partially neutralizing (76 percent of the total theoretical neutralization) the JEFFAMINE D-2000 with acetic acid. The amount of JEFFAMINE D-2000 present in the composition was about 1 percent by weight based on cationic resin solids. Zinc phosphate pretreated steel panels were cathodically electrodeposited and the wet films baked as described above.

EXAMPLE 1C

To the electrodeposition bath of Example 1B was added an additional 6.2 parts by weight (2 percent by weight JEFFAMINE D-2000 based on cationic resin solids) of the acid-solubilized JEFFAMINE D-2000. Zinc phosphate pretreated steel panels were electrodeposited and the wet films baked as described above.

EXAMPLE 1D

To the electrodeposition bath of Example 1C was added an additional 12.1 grams of the acid-solubilized JEFFAMINE D-2000 (3.8 percent by weight JEFFAMINE D-2000 based on cationic resin solids). Zinc phosphate pretreated and untreated steel panels were cathodically electrodeposited and the wet films baked as described above.

EXAMPLE 1E

To the electrodeposition bath of Example 1D was added an additional 21.5 grams of the acid-solubilized JEFFAMINE D-2000 (7 percent by weight JEFFAMINE D-2000 based on cationic resin solids). Zinc phosphate pretreated and untreated steel panels were cathodically electrodeposited and the wet films baked as described above.

EXAMPLE 1F

A cationic electrodeposition bath containing the acid-solubilized polyoxyalkylenepolyamine-polyepoxide adduct of the invention was prepared as follows:

| Ingredients | Parts by Weight | Vehicle | Pigment |
|---|---|---|---|
| Cationic electrodeposition resin of Example B | 1477.6 | 512.7 (81%) | |
| Polyoxyalkylenepolyamine-polyepoxide adduct of Example G | 267.6 | 95.0 (15%) | |
| Catalyst paste of Example T | 12.0 | | |
| Pigment paste of Example Q | 246.9 | 25.4 (4%) | 126.9 |
| Deionized water | 795.9 | | |

The electrodeposition bath prepared as described above had a pH of 6.45, a rupture voltage of 350 volts, a specific conductivity of 1550, and a GM throwpower of 12¾ inches. Zinc phosphate pretreated steel and untreated steel panels were cathodically electrocoated in the bath at 275 volts for 2 minutes at a bath temperature of 73° F. (23° C.). The wet films were cured at 350° F. (177° C.) for 30 minutes.

| Ingredients | Parts by Weight | Solids | Amine/Epoxide Equivalent Ratio |
|---|---|---|---|
| Polyoxyalkylenepolamine-polyepoxide adduct of Example H | 528.1 | 172.7 (25%) | 1.50/1 |
| Cationic electrodeposition resin of Example A | 1417.2 | 503.1 (75%) | |
| Catalyst paste of Example T | 27.6 | | |
| Deionized water | 1674.3 | | |
| Pigment paste of Example R | 152.8 | 15.0 | |

The coating composition in the form of an electrodeposition bath had a pH of 6.3, a specific conductivity of 1400, a rupture voltage of 350 volts and a General Motors throwpower of 11¾ inches at 300 volts. Both zinc phosphate pretreated steel and untreated steel panels were cathodically electrocoated in the electrodeposition bath at 300 volts (for the zinc phosphate pretreated) and 250 volts (for the untreated steel) for 2 minutes at a bath temperature of 80° F. (27° C.). The wet films were cured at 350° F. (177° C.) for 30 minutes.

EXAMPLE 2B

TABLE I

Evaluation of Cured Coatings of Examples 1A–1F for Surface Appearance, Water Resistance and Flexibility

| Example/Substrate | Water Resistance[1] | | Flexibility Impact Resistance[2] | | Surface Appearance |
|---|---|---|---|---|---|
| | Primer | Topcoat[3] | Primer-Reverse | Topcoat-Direct[3] | |
| 1A/zinc phosphate | 10 | 5 | 100 | 60 | severe craters |
| 1A/untreated | 10 | 4 | NT[4] | NT | severe craters |
| 1B/zinc phosphate | NT | NT | NT | NT | severe craters |
| 1C/zinc phosphate | 10 | 6 | 160 | 60 | severe craters |
| 1C/untreated | 10 | 5 | NT | NT | severe craters |
| 1D/zinc phosphate | NT | NT | NT | NT | smooth, craters |
| 1D/untreated | NT | NT | NT | NT | severe craters |
| 1E/zinc phosphate | 10 | 6 | NT | NT | smooth, craters |
| 1E/untreated | 10 | 5 | NT | NT | smooth, severe craters |
| 1F/zinc phosphate | 10 | 8 | 160 | 40 | smooth, no craters |
| 1F/untreated | 10 | 7 | NT | NT | smooth, no craters |

[1] Water resistance determined by soaking coated panel in water at 120° F. (49° C.) for 24 hours, removing the panel from the water, permitting it to stand at room temperature for one hour, followed by crosshatching the coated surface, taping the crosshatched area with masking tape and pulling the masking tape off at a 45° angle. Ratings were assigned a value of 1 to 10 depending upon hou much paint was removed with the masking tape, with 1 being the worst and 10 being the best.
[2] Flexibility determined by impact resistance with a Gardner Impact Tester. The coated panels were subjected to increasing amounts of impact until the coating cracked. One hundred sixty (160) inch-pounds is the upper limit of the test. For reverse impact, the side opposite the coating being evaluated was impacted. For direct impact, the side of the coating being evaluated was impacted.
[3] The topcoat, about 2 mils dry film thickness, was applied from a white coating composition based on a non-aqueous dispersion acrylic polymer. The coating composition as received from Cook Paint and Varnish Company as WEA-5111 was reduced with a 50/50 mixture of xylene and an aromatic blend of solvents having a boiling point of 155 to 184 so as to obtain a 17 second viscosity measured with a No. 4 Ford cup.
[4] Not tested.

EXAMPLE 2

The following exemplifies the improved cationic electrodepositable coating compositions of the present invention containing polyepoxide-polyoxyalkylenepolyamine adducts of various amine/epoxide equivalent ratios.

The compositions were electrodeposited onto various steel substrates, the wet films cured at elevated temperature and the cured coating evaluated for surface appearance as shown in Table II appearing at the end of the example.

EXAMPLE 2A

A cationic electrodepositable coating composition was prepared by blending the following ingredients:

A cationic electrodepositable coating composition was prepared by blending the following ingredients:

| Ingredients | Parts by Weight | Solids | Amine/Epoxide Equivalent Ratio |
|---|---|---|---|
| Cationic electrodeposition resin of Example A | 951.8 | 337.9 | |
| Plasticizer[1] | 34.5 | 34.5 | |
| Polyoxyalkylene-polyamine-polyepoxide adduct of Example I | 866.9 | 303.4 | 1.33/1 |
| Deionized water | 1788.7 | | |
| Pigment paste of Example S | 158.1 | 15.0 | |

[1] PARAPLEX P-1 commercially available from Rohm and Haas Company.

The coating composition in the form of an electrodeposition bath had a pH of 6.5, a specific conductivity of 1000, a rupture voltage of 325 volts and a GM throwpower of 10½ inches at 275 volts. Zinc phosphate pretreated and untreated steel panels were cathodically electrodeposited in the bath at 275 volts (for zinc phosphate pretreated) and 225 volts (for untreated steel) for 2 minutes at a bath temperature of 78° F. (26° C.). The wet film was cured at 350° F. (177° C.) for 30 minutes.

EXAMPLE 2C

A cationic electrodepositable coating composition was prepared by blending the following ingredients:

| Ingredients | Parts by Weight | Solids | Amine/Epoxide Equivalent Ratio |
|---|---|---|---|
| Cationic electrodeposition resin of Example B | 898.7 | 337.9 | |
| Plasticizer of Example 2B | 20.7 | 20.7 | |
| Polyepoxide-polyoxyalkylene-polyamine adduct of Example J | 891.0 | 317.2 | 1.25/1 |
| Deionized water | 831.6 | | |
| Pigment paste of Example S | 158.1 | 15.0 | |

The coating composition in the form of an electrodeposition bath had a pH of 6.5, a specific conductivity of 1100. Both zinc phosphate pretreated steel and untreated steel panels were cathodically electrocoated in the electrodeposition bath at 275 volts for 2 minutes at a bath temperature of 80° F. (27° C.). The wet film was cured at 350° F. (177° C.) for 30 minutes.

EXAMPLE 2D

A cationic electrodepositable coating composition was prepared by blending the following ingredients:

| Ingredients | Parts by Weight | Solids | Amine/Epoxide Equivalent Ratio |
|---|---|---|---|
| Polyepoxide-polyoxyalkylene-polyamine adduct of Example K | 908.9 | 317.2 | 1.20/1 |
| Plasticizer of Example 2B | 34.5 | 34.5 | |
| Cationic electrodeposition resin of Example B | 780.4 | 337.9 | |
| Deionized water | 1918.2 | | |
| Pigment paste of Example S | 158.0 | 15.0 | |

The coating composition in the form of an electrodeposition bath had a pH of 6.3, a specific conductivity of 1250, a rupture voltage of 325 volts measured at 80° F. (27° C.) and a General Motors throwpower of 11¾ inches at 275 volts.

Both zinc phosphate pretreated and untreated steel panels were cathodically electrocoated in the electrodeposition bath at 275 volts (for zinc phosphate pretreated) and 225 volts (for untreated steel) for 2 minutes at a bath temperature of 80° F. (27° C.). The wet films were cured at 300° F. (149° C.) for 15 minutes and then for an additional 15 minutes at 350° F. (177° C.).

EXAMPLE 2E

A cationic electrodepositable coating composition was prepared by blending the following ingredients:

| Ingredients | Parts by Weight | Solids | Amine/Epoxide Equivalent Ratio |
|---|---|---|---|
| Polyepoxide-polyoxyalkylene-polyamine adduct of Example L | 878.7 | 317.2 | 1.16/1 |
| Plasticizer of Example 2B | 34.5 | 34.5 | |
| Cationic electrodeposition resin of Example B | 780.4 | 337.9 | |
| Deionized water | 1948.4 | | |
| Pigment paste of Example S | 158.0 | 15.0 | |

The coating composition in the form of a cationic electrodeposition bath had a pH of 6.3, a specific conductivity of 1100 and a rupture voltage of 350 volts measured at 80° F. (27° C.). Zinc phosphate pretreated steel panels and untreated steel panels were cathodically electrodeposited in the bath at 275 volts (for zinc phosphate pretreated) and 225 volts (for untreated steel) for 2 minutes at a bath temperature of 85° F. (29° C.). The wet films were cured at 350° F. (177° C.) for 30 minutes.

EXAMPLE 2F

A cationic electrodepositable coating composition was prepared by blending the following ingredients:

| Ingredients | Parts by Weight | Solids | Amine/Epoxide Equivalent Ratio |
|---|---|---|---|
| Cationic electrodepositable resin of Example B | 780.4 | 337.9 | |
| Plasticizer of Example 2B | 34.5 | 34.5 | |
| Polyepoxide-polyoxyalkylene-polyamine adduct of Example M | 919.4 | 317.2 | 1.20/1 |
| Deionized water | 1907.7 | | |
| Pigment paste of Example S | 158.0 | 15.0 | |

Both zinc phosphate pretreated steel and untreated steel panels were cathodically electrocoated in the electrodeposition bath at 275 volts for 2 minutes at a bath temperature of 80° F. (27° C.). The wet films were cured at 350° F. (177° C.) for 30 minutes.

TABLE II

Evaluation of Examples 2A–2F for Surface Appearance

| Example | Amine/Epoxide Equivalent Ratio in Polyoxyalkylenepolyamine-Polyepoxide Adduct | Surface Appearance |
|---|---|---|
| 2A | 1.50/1 | smooth and substantially free of craters |
| 2B | 1.33/1 | velvety and substantially free of 1.25/1 |
| 2C | 1.25/1 | smooth and substantially free of craters |
| 2D | 1.20/1 | velvety and substantially free of craters |
| 2E | 1.16/1 | substantially free of craters |
| 2F | 1.20/1 | smooth and substantially free of craters |

EXAMPLE 3

The following example shows the preparation of cationic electrodepositable coating compositions of the invention containing various polyoxyalkylenepolyamine-polyepoxide adducts described in Examples N, O and P above. For the purposes of comparison, compositions without the adduct were also prepared. The compositions were electrodeposited on the steel substrates, the wet films cured at elevated temperature and the cured coating evaluated for surface appearance and other physical properties as shown in Table III appearing at the end of the example.

EXAMPLE 3A

A cationic electrodeposition bath containing a conventional coating composition without the polyoxyalkylenepolyamine-polyepoxide adduct was prepared by blending the following ingredients:

| Ingredients | Resin Solids | Pigment Solids | Parts by Weight |
|---|---|---|---|
| Cationic electrodepositable resin of Example B | 607.6 (96%) | | 1751.0 |
| Deionized water | | | 1787.9 |
| Pigment paste of Example Q | 25.4 (4%) | 126.9 | 246.9 |
| Catalyst paste of Example T | | | 14.8 |

Zinc phosphate pretreated steel panels and untreated steel panels were cathodically electrodeposited in the bath at 275 volts (for the zinc phosphate pretreated) and 260 volts (for untreated steel) for 2 minutes at a bath temperature of 74° F. (23° C.). The wet films were cured at 182° C. for 20 minutes.

EXAMPLE 3B

A cationic electrodeposition bath containing the polyoxyalkylenepolyamine-polyepoxide adduct of Example N was prepared by blending the following ingredients:

| Ingredients | Resin Solids | Pigment Solids | Parts by Weight |
|---|---|---|---|
| Cationic electrodeposition resin of Example B | 512.7 (81%) | | 1477.5 |
| Polyoxyalkylenepolyamine-polyepoxide adduct of Example N | 94.9 (15%) | | 263.0 |
| Deionized water | | | 1797.7 |
| Pigment paste of Example Q | 25.4 (4%) | 126.9 | 246.9 |
| Catalyst paste of Example T | | | 14.8 |

Zinc phosphate pretreated and untreated steel panels were cathodically electrocoated in the bath at 275 volts (for the zinc phosphate pretreated) and 260 volts (for the untreated steel panels) for 2 minutes, bath temperature 73° F. (23° C.). The wet films were cured at 360° F. (182° C.) for 20 minutes.

EXAMPLE 3C

A cationic electrodeposition bath containing the polyoxyalkylenepolyamine-polyepoxide adduct of Example O was prepared by blending the following ingredients:

| Ingredients | Resin Solids | Pigment Solids | Parts by Weight |
|---|---|---|---|
| Cationic electrodeposition resin of Example B | 512.7 (87%) | | 1477.5 |
| Polyoxyalkylenepolyamine-polyepoxide adduct of Example O | 94.9 (9%) | | 257.9 |
| Deionized water | | | 1803.0 |
| Pigment paste of Example Q | 25.4 (4%) | 126.9 | 246.8 |
| Catalyst paste of Example T | | | 14.8 |

Zinc phosphate pretreated and untreated steel panels were cathodically electrodeposited in the bath at 275 volts (for the zinc phosphate pretreated) and 260 volts (for the untreated steel panels) for 2 minutes at a bath temperature of 73° F. (23° C.). The wet films were cured at 360° F. (182° C.) for 20 minutes.

EXAMPLE 3D

A cationic electrodeposition bath containing the polyoxyalkylenepolyamine-polyepoxide adduct of Example P was prepared by blending the following ingredients:

| Ingredients | Resin Solids | Pigment Solids | Parts by Weight |
|---|---|---|---|
| Cationic electrodeposition resin of Example B | 512.7 (81%) | | 1477.5 |
| Polyoxyalkylenepolyamine-polyepoxide adduct of Example P | 94.9 (15%) | | 265.8 |
| Deionized water | | | 1795.1 |
| Pigment paste of Example Q | 25.4 (4%) | 126.9 | 246.8 |
| Catalyst paste of Example T | | | 14.8 |

Zinc phosphate pretreated and untreated steel panels were cathodically electrocoated in the bath at 275 volts (for the zinc phosphate pretreated) and 260 volts (for the untreated steel panels) for 2 minutes at a bath temperature of 73° F. (23° C.). The wet films were baked at 360° F. (182° C.) for 20 minutes.

TABLE III

Evaluation of Cured Coatings of Examples 3A–3D for Flexibility, Water Resistance and Surface Appearance

| | Flexibility | | Water Soak | | Surface Appearance | |
|---|---|---|---|---|---|---|
| Example | Direct Impact Resistance on Zinc Phosphate Pretreated Panels (inch/pounds) | Mandrel Bend[1] | Zinc Phosphate Pretreated | Untreated | Zinc Phosphate Pretreated | Untreated |
| 3A | 160 | Pass | 10 | 8 | Cratered | Cratered Rough |
| 3B | 160 | Pass | 10 | 10 | Smooth No craters | Rough No craters |
| 3C | 160 | Pass | 10 | 10 | Wrinkled No craters | Rough No craters |
| 3D | 160 | Pass | 10 | 10 | Textured Few craters | Rough Few craters |

[1]ASTM D-522-60, gradual 180° bend around mandrel. Area of the bend crosshatched and taped and tape pulled off at 45° angle. Pass rating indicates no paint pull off. Fail rating would be indicated by substantial paint pull off.

EXAMPLE 4

The following example shows the preparation of cationic electrodepositable coating compositions of the invention containing the polyoxyalkylenepolyamine-polyepoxide adduct of Example G blended with various cationic electrodepositable resins of Examples C, D, E and F. For the purposes of control, conventional coating compositions without the polyoxyalkylenepolyamine-polyepoxide adducts were also prepared. The compositions were electrodeposited onto steel substrates, the wet films cured at elevated temperatures and the cured coatings evaluated for surface appearance and other physical properties as shown in Table IV appearing at the end of the example.

CATIONIC ELECTRODEPOSITION BATHS

EXAMPLE 4A

| Ingredients | Resin Solids | Pigment Solids | Parts by Weight |
|---|---|---|---|
| Cationic electrodepositable resin of Example C | 351.9 | | 1005.4 |
| Deionized water | | | 1043.4 |
| Pigment paste of Example Q | 14.7 | 73.3 | 142.6 |
| Catalyst paste of Example T | | | 8.5 |

Zinc phosphate pretreated and untreated steel panels were cathodically electrodeposited in the bath at 100 volts for 2 minutes at a bath temperature of 80° F. (27° C.). The wet films were baked at 360° F. (182° C.) for 20 minutes.

EXAMPLE 4B

| Ingredients | Resin Solids | Pigment Solids | Parts by Weight |
|---|---|---|---|
| Cationic electrodepositable resin of Example C | 297.0 | | 848.5 |
| Polyoxyalkylenepolyamine-polyepoxide adduct of Example G | 54.9 | | 151.9 |
| Deionized water | | | 1048.4 |
| Pigment paste of Example Q | 14.7 | 73.3 | 142.6 |
| Catalyst paste of Example T | | | 8.5 |

Zinc phosphate pretreated steel and untreated steel panels were cathodically electrodeposited in the bath at 100 volts for 2 minutes at a bath temperature of 80° F. (27° C.). The wet films were baked at 360° F. (182° C.) for 20 minutes.

EXAMPLE 4C

| Ingredients | Resin Solids | Pigment Solids | Parts by Weight |
|---|---|---|---|
| Cationic electrodepositable resin of Example D | 351.9 | | |
| Deionized water | | | 1137.2 |
| Pigment paste of Example Q | 14.7 | 73.3 | 142.6 |
| Catalyst paste of Example T | | | 8.5 |

Zinc phosphate pretreated steel panels were cathodically electrocoated in the bath at 150 volts for 2 minutes at a bath teperature of 80° F. (27° C.). The wet films were baked at 360° F. (182° C.) for 20 minutes.

EXAMPLE 4D

| Ingredients | Resin Solids | Pigment Solids | Parts by Weight |
|---|---|---|---|
| Cationic electrodepositable resin of Example D | 297.0 | | 769.4 |
| Polyoxyalkylenepolyamine-polyepoxide adduct of Example G | 54.9 (15%) | | 151.9 |
| Deionized water | | | 1127.6 |
| Pigment paste of Example Q | 14.7 | 73.3 | 142.6 |
| Catalyst paste of Example T | | | 8.5 |

Zinc phosphate pretreated steel panels were cathodically electrodeposited in the bath at 150 volts at a bath temperature of 80° F. (27° C.). The wet films were baked at 360° F. (182° C.) for 20 minutes.

EXAMPLE 4E

| Ingredients | Resin Solids | Pigment Solids | Parts by Weight |
|---|---|---|---|
| Cationic electrodepositable resin of Example E | 143.5 | | 416.2 |
| Deionized water | | | 421.9 |
| Pigment paste of Example Q | 6.0 | 29.9 | 58.3 |
| Catalyst paste of Example T | 0.4 | | 3.5 |

Zinc phosphate pretreated and untreated steel panels were cathodically electrodeposited in the bath at 100 volts for 2 minutes at a bath temperature of 80° F. (27° C.). The wet films were baked at 360° F. (182° C.) for 20 minutes.

EXAMPLE 4F

| Ingredients | Resin Solids | Pigment Solids | Parts by Weight |
|---|---|---|---|
| Cationic electrodepositable resin of Example E | 121.1 | | 351.0 |
| Polyoxyalkylenepolyamine-polyepoxide adduct of Example G | 22.6 (15%) | | 62.5 |
| Deionized water | | | 425.0 |
| Pigment paste of Example Q | 6.0 | 29.9 | 58.3 |
| Catalyst paste of Example T | 0.4 | | 3.5 |

Zinc phosphate pretreated and untreated steel panels were cathodically electrodeposited in the bath at 100 volts for 2 minutes at a bath temperature of 80° F. (27° C.). The wet films were baked at 360° F. (182° C.) for 20 minutes.

EXAMPLE 4G

| Ingredients | Resin Solids | Pigment Solids | Parts by Weight |
|---|---|---|---|
| Cationic electrodepositable resin of Example F | 607.5 | | 1436.3 |
| Deionized water | | | 2101.9 |
| Pigment paste of Example Q | 25.4 | 126.9 | 246.9 |
| Catalyst paste of Example T | | | 14.8 |

Zinc phosphate pretreated steel and untreated steel panels were cathodically electrodeposited in the bath at 75 volts for 2 minutes at a bath temperature of 80° F. (27° C.). The wet films were cured at 360° F. (182° C.) for 20 minutes.

EXAMPLE 4H

| Ingredients | Resin Solids | Pigment Solids | Parts by Weight |
|---|---|---|---|
| Cationic electrodepositable resin of Example F | 269.2 | | 636.4 |
| Polyoxyalkylenepolyamine-polyepoxide adduct of Example G | 49.9 | | 138.1 |
| Deionized water | | | 1088.1 |
| Pigment paste of Example Q | 13.3 | 66.7 | 129.7 |
| Catalyst paste of Example T | 0.9 | | 7.7 |

Zinc phosphate pretreated and untreated steel panels were cathodically electrodeposited in the bath at 75 volts for 2 minutes at a bath temperature of 80° F. (27° C.). The wet films were cured at 182° C. for 20 minutes.

TABLE IV
Evaluation of Cured Coatings of Examples 4A–4H for Flexibility, Water Resistance and Surface Appearance

| | Flexibility Mandrel Bend | Water Soak | | | | Surface Appearance | |
|---|---|---|---|---|---|---|---|
| | | Zinc Phosphate Pretreated | | Untreated | | Zinc Phosphate | |
| Example | | Top Coat | Primer | Top Coat | Primer | Pretreated | Untreated |
| 4A | Fail | 0 | 9 | 0 | 3 | Orange peel Severe craters | Craters |
| 4B | Pass | 8 | 10 | 5 | 10 | Orange peel Few craters | Few craters |
| 4C | Fail | 3 | 10 | 3 | 9 | Rough Orange peel No craters | NT |
| 4D | Fail | 0 | 10 | 0 | 10 | Smooth Craters | NT |
| 4E | Pass | 3 | 9 | 6 | 9 | Rough No craters | Rough No craters |
| 4F | Pass | 8 | 10 | 8 | 9 | Textured No craters | Rough No craters |
| 4G | Pass | 4 | 10 | 4 | 9 | Orange peel No craters | NT |
| 4H | Pass | 7 | 10 | 7 | 9 | Smooth No craters | Discolored No craters |

We claim:

1. An aqueous resinous dispersion which contains from:
(A) 0.5 to 40 percent by weight of an ungelled resin formed from reacting:
 (i) a polyepoxide with
 (ii) a polyoxyalkylenepolyamine; the ratio of equivalents of active hydrogens in (ii), with primary amine groups being considered monofunctional, to equivalents of epoxy in (i) being within the range of 1.20 to 1.70:1, the reaction product being at least partially neutralized with acid to provide cationic groups,
(B) 60 to 99.5 percent by weight of an additional cationic resin different from (A) and which is electrodepositable on a cathode; the percentages by weight being based on total weight of (A) plus (B).

2. The aqueous dispersion of claim 1 wherein the polyepoxide is a polyglycidyl ether of a cyclic polyol.

3. The aqueous dispersion of claim 2 wherein the cyclic polyol is a diol.

4. The aqueous dispersion of claim 3 wherein the polyglycidyl ether of the cyclic diol is a polyglycidyl ether of bisphenol A or hydrogenated bisphenol A having a molecular weight within the range of 340 to 2000.

5. The aqueous dispersion of claim 1 in which the polyoxyalkylenepolyamine is a polyoxypropylenepolyamine.

6. The aqueous dispersion of claim 5 in which the polyoxypropylenepolyamine is a diamine.

7. The aqueous dispersion of claim 1 in which the polyoxyalkylenepolyamine has a molecular weight within the range of 137 to 3600.

8. The aqueous dispersion of claim 7 in which the polyoxyalkylenepolyamine has an amine equivalent weight of about 69 to 1800.

9. The aqueous dispersion of claim 1 containing 0.5 to 50 percent by weight of (A) plus (B) based on total weight of the aqueous dispersion.

* * * * *